UNITED STATES PATENT OFFICE.

JOSEPH JONES, OF NEW ORLEANS, LOUISIANA, ASSIGNOR TO HIMSELF AND PETER WELCH, OF ST. LOUIS, MISSOURI.

IMPROVEMENT IN PRESERVING WOOD.

Specification forming part of Letters Patent No. 118,245, dated August 22, 1871.

*To all whom it may concern:*

Be it known that I, JOSEPH JONES, M. D., of New Orleans, of the parish of Orleans and in the State of Louisiana, have invented a new and Improved Mode of Preserving Wood from Decay, and from the destructive action of marine animals.

The nature of my invention consists in saturating wood in a solution of solid asphalt in turpentine, mixed with carbolic acid, in the following manner: The sap and moisture of the wood are transformed into steam and the albumen coagulated by heat, and the wood while thus heated is immediately plunged into the boiling solution of asphalt mingled with carbolic acid. The proportion of carbolic acid in the solution may be varied, according to the age and density of the wood and the purposes to which it is intended to be applied.

I contemplate the application of the solution to the preservation of timber for railroads, bridges, pavements, submarine structures, ships, houses, and all wooden structures whatsoever.

I dissolve the asphalt in turpentine, the density of the solution to be varied in accordance with the size and density of the timber to be treated. To this solution varying quantities of carbolic acid may be added.

The following formula expresses the average composition: Asphalt, one to thirty parts; carbolic acid, one to ten parts; turpentine, sixty to ninety-eight parts. The compound thus prepared is brought to the boiling-point by means of steam or fire surrounding the vessel in which it is contained.

The wood to be preserved is subjected to the action of heat in the form of heated air or steam, in a closed chamber, sufficient heat being applied to convert the sap or moisture and fluid portions into vapor. While still hot the wood is plunged into the boiling mixture before described. As the wood cools the solution is driven into its pores, and also penetrates by imbibition. When the wood is removed from the solution and allowed to dry the evaporation of the solvent leaves the asphalt as an impervious coating, blocking up the pores of the wood and effectually excluding the moisture and oxygen of the atmosphere, while the antiseptic carbolic acid inclosed within will prevent decay, and, when the wood is under water, guard it from the attacks of marine animals.

Having thus fully described my invention, what I claim, and desire to secure by Letters Patent, is—

A solution of solid asphalt in turpentine, combined with a varying proportion of carbolic acid, applied, in the manner substantially as described, to the treatment and preservation of timber for the purposes stated.

JOSEPH JONES, M. D.

Witnesses:
J. G. EUSTIS,
E. J. CLEMENTS.